(12) United States Patent
Owaki

(10) Patent No.: US 10,057,104 B2
(45) Date of Patent: *Aug. 21, 2018

(54) SIGNAL PROCESSING DEVICE, DISPLAY DEVICE, SIGNAL PROCESSING METHOD, AND PROGRAM

(71) Applicant: Panasonic Intellectual Property Management Co., Ltd., Osaka (JP)

(72) Inventor: Yoshiaki Owaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/557,179

(22) PCT Filed: Mar. 23, 2016

(86) PCT No.: PCT/JP2016/001673
§ 371 (c)(1),
(2) Date: Sep. 11, 2017

(87) PCT Pub. No.: WO2016/157838
PCT Pub. Date: Oct. 6, 2016

(65) Prior Publication Data
US 2018/0041373 A1    Feb. 8, 2018

(30) Foreign Application Priority Data
Mar. 27, 2015 (JP) .................. 2015-067536

(51) Int. Cl.
*H04N 5/57* (2006.01)
*H04N 7/01* (2006.01)
(Continued)

(52) U.S. Cl.
CPC ......... *H04L 29/06482* (2013.01); *G09G 5/20* (2013.01); *H04N 5/66* (2013.01); *H04N 21/431* (2013.01)

(58) Field of Classification Search
CPC .......... H04N 5/66; H04N 21/431; H04N 5/57; H04N 7/01; H04N 7/015; H04N 5/44; H04N 5/50; H04L 29/06482; G09G 5/20
(Continued)

(56) References Cited

U.S. PATENT DOCUMENTS

2002/0110277 A1    8/2002  Ono et al.
2003/0001964 A1    1/2003  Masukura et al.
(Continued)

FOREIGN PATENT DOCUMENTS

EP    3013040 A1    4/2016
JP    2-033265      2/1990
(Continued)

OTHER PUBLICATIONS

International Search Report of PCT application No. PCT/JP2016/001673 dated Jun. 14, 2016.
(Continued)

*Primary Examiner* — Sherrie Hsia
(74) *Attorney, Agent, or Firm* — McDermott Will & Emery LLP

(57) ABSTRACT

A signal processing device includes a converter and a selector. The converter converts an input video signal into the output video signal for the low-brightness display device. The selector selects one of the input video signal and the output video signal, and outputs the selected video signal to the display. The selector selects the output video signal in a case where a high-brightness flag indicating a video signal for a high-brightness display device is added to the input video signal, and the selector selects the input video signal in a case where the high-brightness flag is not added to the input video signal.

13 Claims, 15 Drawing Sheets

(51) Int. Cl.
  *H04N 5/50* (2006.01)
  *H04L 29/06* (2006.01)
  *G09G 5/20* (2006.01)
  *H04N 5/66* (2006.01)
  *H04N 21/431* (2011.01)

(58) Field of Classification Search
  USPC ....... 348/441, 445, 458, 459, 687, 690, 725, 348/731
  See application file for complete search history.

(56) References Cited

U.S. PATENT DOCUMENTS

| | | |
|---|---|---|
| 2004/0004666 A1 | 1/2004 | Sano |
| 2012/0321273 A1 | 12/2012 | Messmer |
| 2014/0079113 A1 | 3/2014 | Newton et al. |
| 2014/0225941 A1 | 8/2014 | Van der Vleuten et al. |
| 2015/0178895 A1* | 6/2015 | Owaki .................... G09G 5/28 382/195 |
| 2015/0208024 A1 | 7/2015 | Takahashi et al. |
| 2016/0134832 A1 | 5/2016 | Yamamoto et al. |
| 2016/0345040 A1 | 11/2016 | Oh et al. |

FOREIGN PATENT DOCUMENTS

| | | |
|---|---|---|
| JP | 2002-118752 | 4/2002 |
| JP | 2003-046859 | 2/2003 |
| JP | 2003-087785 | 3/2003 |
| JP | 2013-527996 | 7/2013 |
| JP | 2014-519620 | 8/2014 |
| JP | 2015-008024 | 1/2015 |
| WO | 2014/203746 A1 | 12/2014 |
| WO | 2015/008685 A1 | 1/2015 |

OTHER PUBLICATIONS

The Extended European Search Report dated Mar. 22, 2018 for the related European Patent Application No. 16771728.9.
The Extended European Search Report dated Mar. 22, 2018 for the related European Patent Application No. 16771729.7.
International Search Report issued in Application No. PCT/JP2016/001674 dated Jun. 14, 2016 with English translation.
U.S. Office Action issued in U.S. Appl. No. 15/557,185 dated Apr. 19, 2018.

* cited by examiner

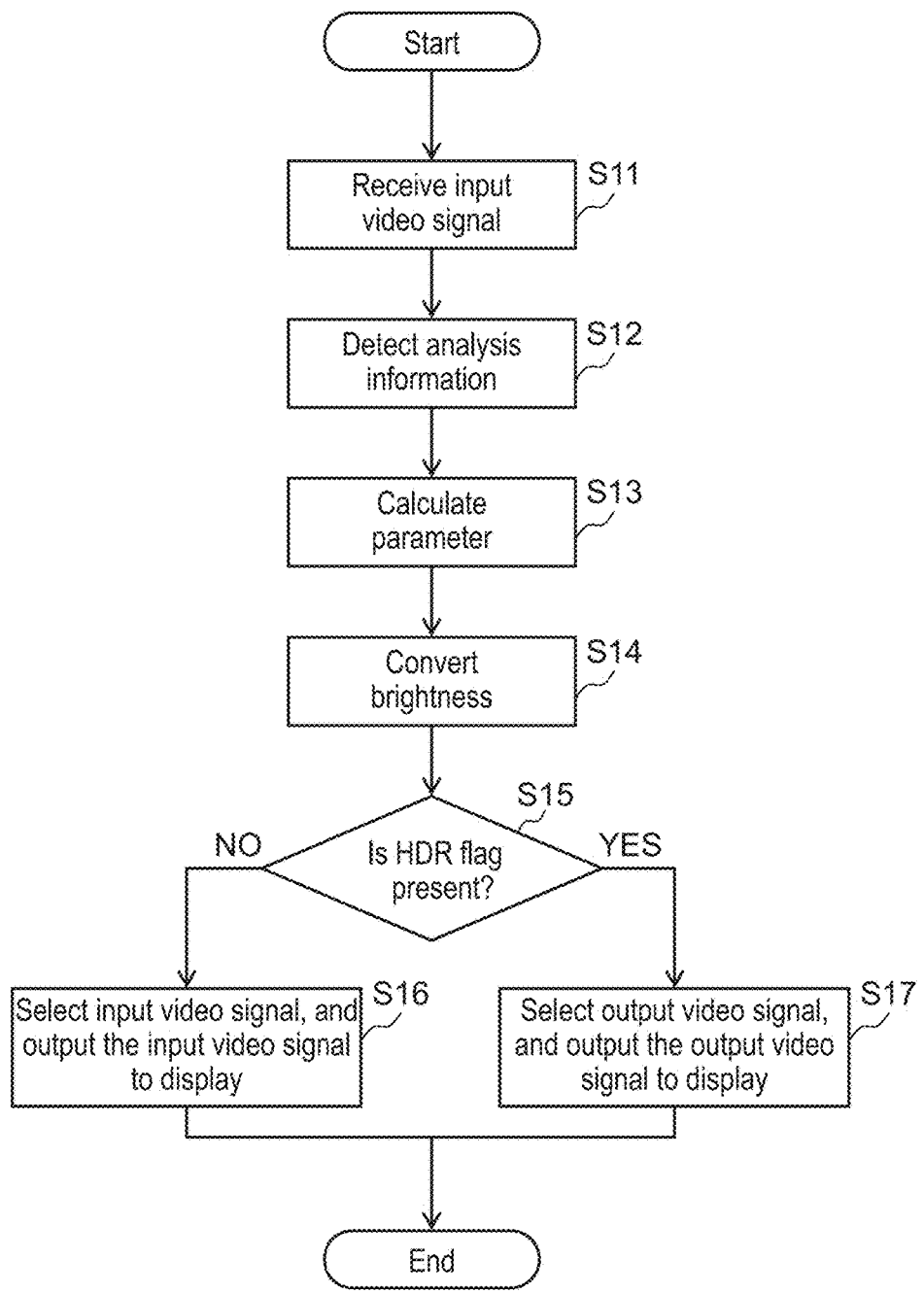

SIGNAL PROCESSING DEVICE, DISPLAY DEVICE, SIGNAL PROCESSING METHOD, AND PROGRAM

This application is a U.S. national stage application of the PCT International Application No. PCT/JP2016/001673 filed on Mar. 23, 2016, which claims the benefit of foreign priority of Japanese patent application 2015-067536 filed on Mar. 27, 2015, the contents all of which are incorporated herein by reference.

TECHNICAL FIELD

The present disclosure relates to a signal processing device, a display device, a signal processing method, and a program, which process a video signal conforming to a standard that handles a wider range than a standard dynamic range (hereinafter, this standard is referred to as a "standard that handles HDR (High Dynamic Range)").

BACKGROUND ART

Patent Literature 1 discloses a reproduction device that transmits HDR data and HDR information to a monitor having a wider dynamic range (range of brightness) than a standard one in order to make full use of performance of the monitor. Upon receiving the HDR data and the HDR information from this reproduction device, the monitor adjusts the HDR data based on the HDR information, and displays a video matched with characteristics of the monitor itself.

CITATION LIST

Patent Literature

PTL 1: Unexamined Japanese Patent Publication No. 2015-8024

SUMMARY

In some cases, HDR data is sent to a monitor having a standard dynamic range. The HDR data is a video signal with a brightness exceeding a brightness displayable by a standard monitor. Moreover, in the standard monitor, it is not assumed that such a video signal is input thereto, and the HDR data cannot be adjusted. Therefore, when the HDR data is displayed by the standard monitor while being left unadjusted, black floating (which refers to a phenomenon that a brightness of black looks increased) occurs in a low-brightness portion, and lightness becomes low in a high-brightness portion, and accordingly, it is apprehended that a contrast may be decreased to decrease image quality.

The present disclosure provides a signal processing device, a display device, a signal processing method, and a program, which suppress the decrease of the image quality even in a case of inputting, to a monitor, such a video signal exceeding a capacity of the monitor.

The signal processing device in the present disclosure is a signal processing device that outputs a video signal to a display. The signal processing device includes a converter and a selector. The converter converts an input video signal into an output video signal for a low-brightness display device in which an upper limit value of a range of a displayable brightness is smaller than an upper limit value in a high-brightness display device. The selector receives the input video signal and the output video signal, selects one of the input video signal and the output video signal, and outputs the selected video signal to the display. The selector selects the output video signal in a case where a high-brightness flag indicating a video signal for a high-brightness display device is added to the input video signal, and the selector selects the input video signal in a case where the high-brightness flag is not added to the input video signal.

The signal processing method in the present disclosure is a signal processing method of outputting a video signal to a display. The signal processing method includes: converting an input video signal into an output video signal for a low-brightness display device in which an upper limit value of a range of a displayable brightness is smaller than an upper limit value in a high-brightness display device; and selecting one of the input video signal and the output video signal and outputting the selected video signal to the display, wherein the output video signal is selected in a case where a high-brightness flag indicating a video signal for the high-brightness display device is added to the input video signal, and the input video signal is selected in a case where the high-brightness flag is not added to the input video signal.

The signal processing device, the display device, the signal processing method and the program in the present disclosure can suppress the decrease of the image quality even when the video signal exceeding the capacity of the monitor is input to the monitor.

BRIEF DESCRIPTION OF DRAWINGS

FIG. 15 is a flowchart showing an example of a signal processing method executed in a tuner in the second exemplary embodiment.

DESCRIPTION OF EMBODIMENTS

Figure 1:
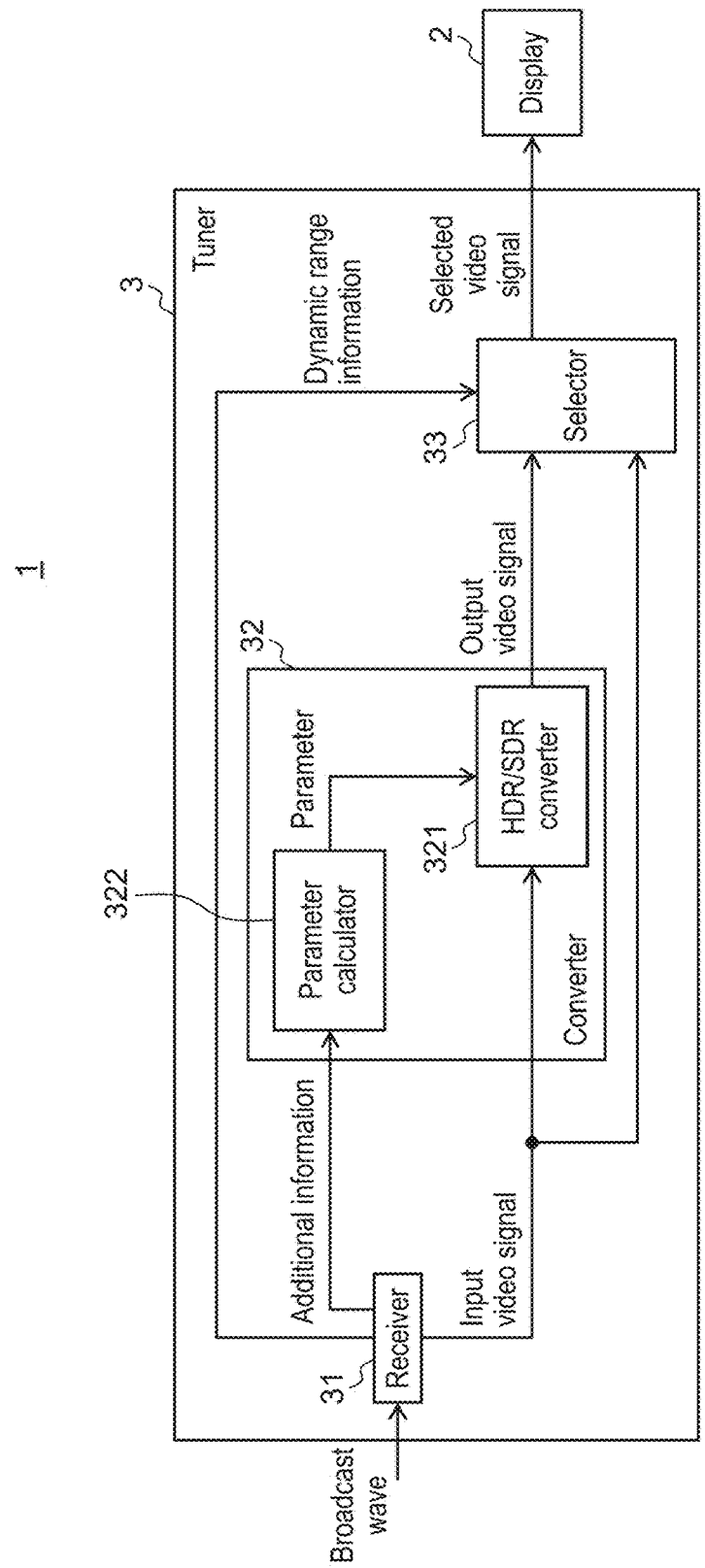
FIG. 1 is a block diagram schematically showing a configuration example of a display device in a first exemplary embodiment.

A description is made below in detail of embodiments with reference to the drawings as appropriate. However, a description more in detail than necessary is omitted in some cases. For example, a detailed description of a well-known item and a duplicate description of substantially the same configuration are omitted in some cases. These omissions are made in order to avoid unnecessary redundancy of the following description and to facilitate the understanding of those skilled in the art.

Note that the accompanying drawings and the following description are provided in order to allow those skilled in the art to fully understand the present disclosure, and it is not intended to thereby limit the subject described in the scope of claims.

Moreover, the respective drawings are schematic views, and are not illustrated necessarily exactly. Furthermore, in the respective drawings, in some cases, the same reference numerals are assigned to the same constituent elements, and a description thereof is omitted or simplified.

First Exemplary Embodiment

A description is made below of a first exemplary embodiment with reference to FIG. 1 to FIG. 8.

[1-1. Configuration]

[1-1-1. Display Device]

FIG. 1 is a block diagram schematically showing a configuration example of display device 1 in the first exemplary embodiment.

In the first exemplary embodiment, for example, display device 1 is a television set (hereinafter, referred to as a "television") that displays a video by receiving a broadcast wave. As shown in FIG. 1, display device 1 includes display 2 and tuner 3. Display 2 and tuner 3 are communicably connected to each other.

Note that FIG. 1 only shows constituents, which are related to this exemplary embodiment, among a plurality of constituents provided in display device 1, and the other constituents are omitted. The other constituents include constituents provided generally in a television. A description of these constituents is omitted.

Display 2 receives a video signal sent from tuner 3, and displays a video based on the video signal. As display 2, for example, a liquid crystal display panel, an organic EL (Electro Luminescence) display panel and the like are mentioned. In display 2, a displayable brightness range (dynamic range) is determined. Here, display 2 capable of display in the standard dynamic range is illustrated.

Note that, in this exemplary embodiment, it is assumed that an upper limit value of the standard dynamic range is set, for example, to 100 cd/m$^2$ (=100 nit), and a range of 0% to 100% of the upper limit value is defined as the standard dynamic range. A dynamic range larger than the standard dynamic range is shown as a range of 101% or more. A dynamic range conforming to a standard that handles HDR takes an approximate range of 0% to 10000%.

This exemplary embodiment illustrates a case where a video signal conforming to the standard that handles HDR is defined as a video signal for a high-brightness display device, and a video signal corresponding to the standard dynamic range is defined as a video signal for a low-brightness display device. The high-brightness display device is a display device capable of displaying the dynamic range larger than the standard dynamic range, and for example, is a display device capable of displaying the video signal conforming to the standard that handles HDR. The low-brightness display device is a display device smaller than the high-brightness display device in terms of an upper limit value of the displayable brightness, and for example, is a display device capable of displaying the video signal corresponding to the standard dynamic range.

[1-1-2. Tuner]

Tuner 3 is a signal processing device that converts a broadcast wave, which is input through an antenna, into a video signal, and outputs the video signal to display 2.

Tuner 3 is realized, for example, as a 1-chip semiconductor integrated circuit such as an LSI (Large Scale Integrated Circuit). Tuner 3 includes receiver 31, converter 32 and selector 33. Note that receiver 31, converter 32 and selector 33 may be realized by a plurality of integrated circuits, or may be realized by pluralities of individual circuits and discrete components.

Receiver 31 is a circuit that converts the broadcast wave, which is input through the antenna, into an input video signal.

To the input video signal, there is added dynamic range information that indicates a type of a dynamic range of a video by the input video signal. For example, in a case where the input video signal is the video signal for the high-brightness display device, an HDR flag (high-brightness flag) is added as the dynamic range information to the input video signal. Meanwhile, in a case where the input video signal is the video signal for the low-brightness display device, an SDR (Standard Dynamic Range) flag (low-brightness flag) is added as the dynamic range information. Moreover, additional information is added to the input video signal in advance.

The additional information includes a value related to the brightness of the input video signal. Specifically, as the value related to the brightness of the input video signal, there are mentioned: a maximum brightness in one frame of the input video signal; an average brightness in one frame of the input video signal; an average maximum brightness per frame, which is calculated from maximum brightnesses in a predetermined number of frames of the input video signal; a brightness histogram in one frame of the input video signal; and a motion vector per unit pixel block included in the input video signal.

This exemplary embodiment is described by illustrating a case where the maximum brightness in one frame of the input video signal is added to the input video signal of each frame. Note that the same additional information may be added to a whole of such input video signals which compose one content. In this case, as the additional information, for example, there may be defined at least one of respective average values of the maximum brightnesses, the average brightnesses, the brightness histograms and the motion vectors, which are obtained from all frames which compose one content.

Receiver 31 outputs the additional information, which is added to the input video signal, to parameter calculator 322 of converter 32. Moreover, receiver 31 outputs the input video signal to selector 33 and HDR/SDR converter 321 of converter 32. Furthermore, receiver 31 outputs the dynamic range information, which is added to the input video signal, to selector 33.

Converter 32 is a circuit that generates an output video signal in such a manner as follows. That is, converter 32 converts the input video signal including the video signal, which is for the high-brightness display device, into the video signal, which is for the low-brightness display device which has a smaller upper limit value of the range of the displayable brightness than the high-brightness display device. Specifically, converter 32 includes HDR/SDR converter 321 and parameter calculator 322.

HDR/SDR converter 321 is a circuit that generates the output video signal in such a manner as follows. That is, HDR/SDR converter 321 implements brightness conversion processing for the input video signal by using a parameter calculated by parameter calculator 322.

Figure 2:
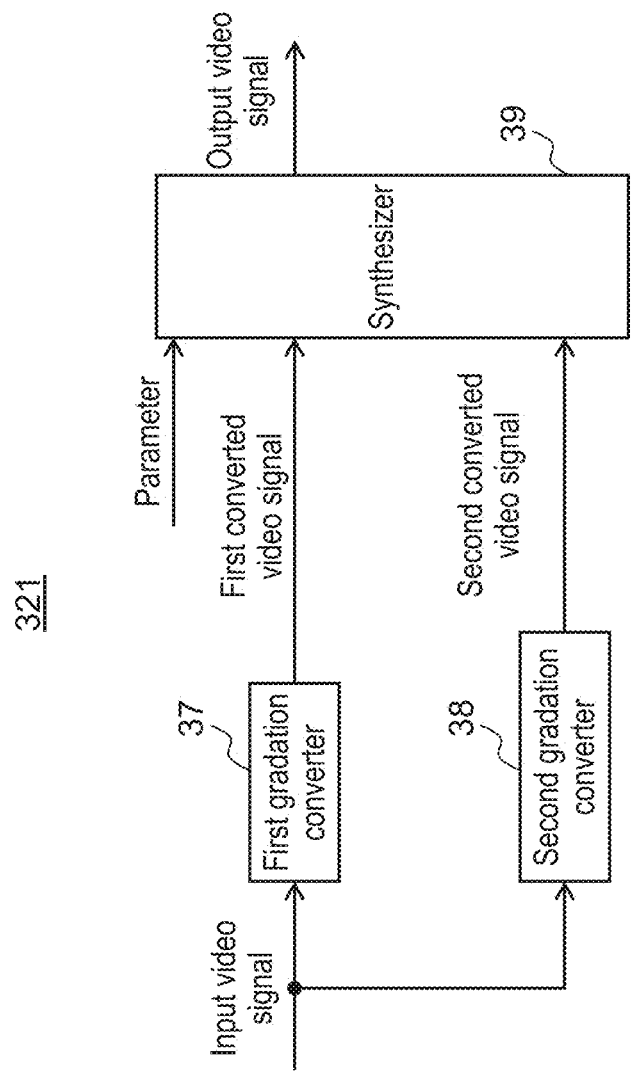
FIG. 2 is a block diagram schematically showing a configuration example of an HDR/SDR converter in the first exemplary embodiment.

FIG. 2 is a block diagram schematically showing a configuration example of HDR/SDR converter 321 in the first exemplary embodiment.

HDR/SDR converter 321 includes first gradation converter 37, second gradation converter 38 and synthesizer 39.

Figure 3:
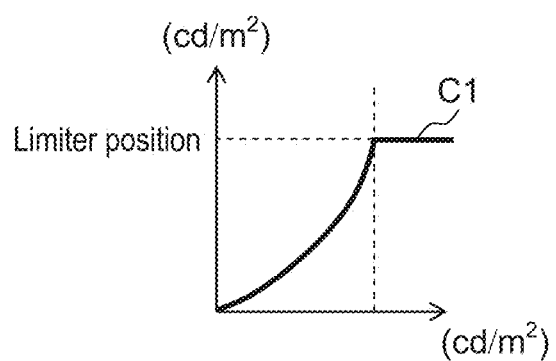
FIG. 3 is a graph showing an example of a first conversion characteristic curve in the first exemplary embodiment.

First gradation converter 37 is a circuit that converts the brightness of the input video signal by using first conversion characteristic curve C1 (refer to FIG. 3). First gradation converter 37 outputs a first converted video signal after the conversion to synthesizer 39.

Figure 4:
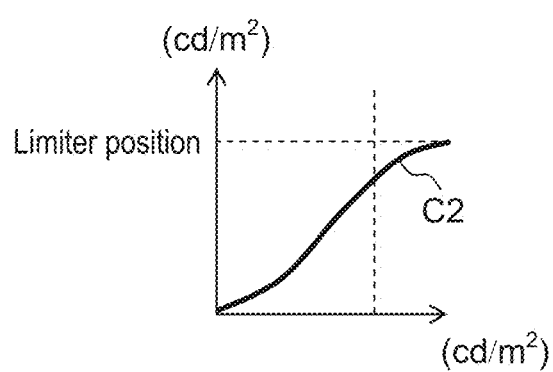
FIG. 4 is a graph showing an example of a second conversion characteristic curve in the first exemplary embodiment.

Second gradation converter 38 is a circuit that converts the brightness of the input video signal by using second conversion characteristic curve C2 (refer to FIG. 4). Second gradation converter 38 outputs a second converted video signal after the conversion to synthesizer 39.

Here, a description is made of first conversion characteristic curve C1 and second conversion characteristic curve C2.

FIG. 3 is a graph showing an example of first conversion characteristic curve C1 in the first exemplary embodiment.

FIG. 4 is a graph showing an example of second conversion characteristic curve C2 in the first exemplary embodiment.

First conversion characteristic curve C1 and second conversion characteristic curve C2 are merely examples, and are changeable as long as staying within a range that meets a purpose of the brightness conversion. Moreover, in each of FIG. 3 and FIG. 4, an axis of abscissas represents the brightness of the input video signal, and an axis of ordinates represents the brightness of the output video signal after the conversion. Moreover, a limiter position of the axis of ordinates is the upper limit value of the dynamic range displayable by display 2.

Figure 5:
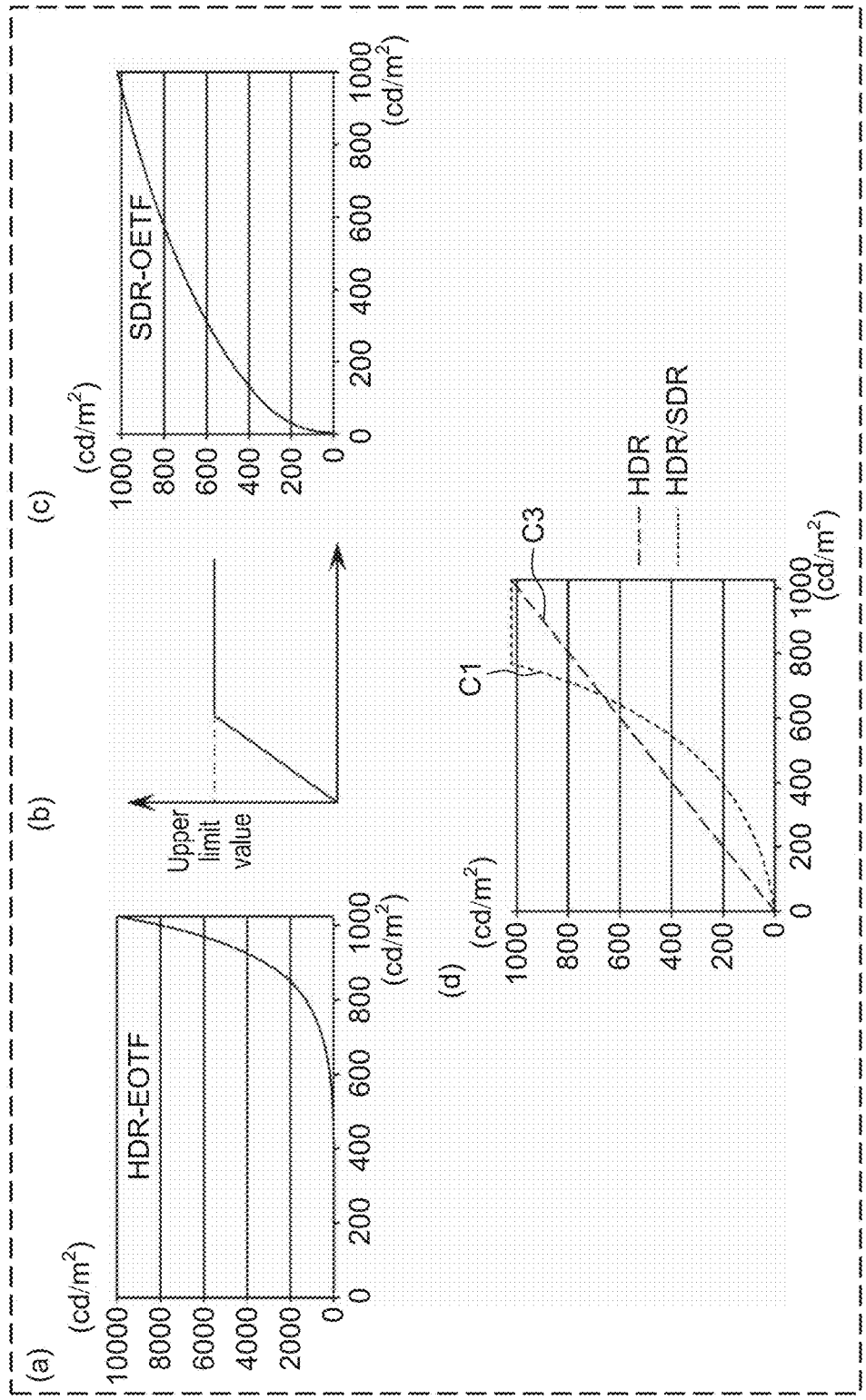
FIG. 5 is diagrams for showing a theory in creating the first conversion characteristic curve in the first exemplary embodiment.

FIG. 5 is diagrams for showing a theory in creating first conversion characteristic curve C1 in the first exemplary embodiment. Note that, in each of such graphs in FIG. 5, an axis of abscissas represents the brightness of the input video signal, and an axis of ordinates represents the brightness of the output video signal.

The input video signal is already corrected by OETF (Optical-Electro Transfer Function). EOTF (Electro-Optical Transfer Function) corresponding to this OETF is prepared. FIG. 5(a) shows an example of this EOTF (written as HDR-EOTF in FIG. 5).

FIG. 5(b) is an example of a complement graph matched with the upper limit value of the dynamic range displayable in display 2.

Moreover, OETF corresponding to EOTF expected by display 2 is prepared. FIG. 5(c) shows an example of this OETF (written as SDR-OETF in FIG. 5).

The respective graphs shown in FIGS. 5(a) to 5(c) are multiplied with one another, whereby first conversion characteristic curve C1 shown in FIG. 5(d) is calculated.

Note that FIG. 5(d) shows, as a comparative example, conversion characteristic curve C3 in a case of displaying the input video signal, which conforms to the standard that handles HDR, on the display corresponding to the standard that handles HDR. Conversion characteristic curve C3 is a linear graph as a whole. Meanwhile, first conversion characteristic curve C1 is a graph having a non-linear portion and a linear portion. The linear portion of first conversion characteristic curve C1 is a horizontal segment that takes a value of the limiter position as a reference.

This linear portion of first conversion characteristic curve C1 is a portion of converting a signal in the input video signal, the signal having a brightness exceeding the limiter position (upper limit value of the range of the brightness displayable by display 2), into a signal having a brightness of the value of the limiter position (or a value approximate to the value of the limiter position). In such a way, the input video signal with the brightness exceeding the limiter position is converted by the linear portion into the signal with the upper limit value of the dynamic range displayable by display 2. Note that the value on the linear portion after the conversion does not have to be equal to the value of the limiter position, and may be a value approximate to the value of the limiter position.

The non-linear portion of first conversion characteristic curve C1 is a portion of converting the brightness of the signal in the input video signal, the brightness remaining within the dynamic range (range of the brightness) displayable by display 2, so that the brightness can be based on a predetermined standard. The predetermined standard is a standard that is based on the dynamic range of the video by the input video signal, and based on the dynamic range displayable by display 2. Specifically, as mentioned above, the predetermined standard is a standard obtained by synthesizing three graphs shown in FIGS. 5(a) to 5(c). Note that the predetermined standard is not limited to this, and standards obtained by varieties of experiments, simulations and the like may be used.

When the brightness of the input video signal is converted based on this first conversion characteristic curve C1, a converted video signal is generated, which has lightness close to original lightness inherent in the input video signal, and meanwhile, in a high-brightness portion, may possibly include a pseudo contour, a halation (that is a loss of gradation in the high-brightness portion in the display video), and the like.

As shown in FIG. 4, second conversion characteristic curve C2 is a graph that does not have a horizontal linear portion. Then, in second conversion characteristic curve C2, only the upper limit value of the range of the brightness of the input video signal is converted into the value of the limiter position. By using this second conversion characteristic curve C2, the brightness of the input video signal is reduced so as to remain within the dynamic range (range of brightness) displayable by display 2, and is converted into the output video signal.

Note that, as second conversion characteristic curve C2, for example, a graph linear as a whole, which is like conversion characteristic curve C3 shown in FIG. 5(d), can also be used.

When the brightness of the input video signal is converted based on this second conversion characteristic curve C2, a converted video signal is generated, which maintains the gradation characteristics though becoming darker than the original lightness inherent in the input video signal.

As shown in FIG. 2, synthesizer 39 is a circuit that synthesizes the first converted video signal input from first gradation converter 37 and the second converted video signal input from second gradation converter 38 with each other in a predetermined ratio (hereinafter, also referred to as a "ratio of use"), and outputs the signal, which is thus obtained by the synthesis, as the output video signal to selector 33. Specifically, synthesizer 39 defines a parameter, which is input from parameter calculator 322, as the predetermined ratio, and generates the output video signal by following Equation 1.

Output video signal=first converted video signal×(1−parameter)+second converted video signal×parameter (Equation 1)

As shown in FIG. 1, parameter calculator 322 is a circuit that calculates the parameter for converting the input video signal. Parameter calculator 322 calculates the parameter based on the additional information input from receiver 31. Here, the parameter refers to the ratio of use between first conversion characteristic curve C1 and second conversion characteristic curve C2, which are used in synthesizer 39. Specifically, the parameter is a ratio of the first converted video signal that is based on first conversion characteristic curve C1 and the second converted video signal that is based on second conversion characteristic curve C2 in an event of synthesizing both of them with each other.

Figure 6:
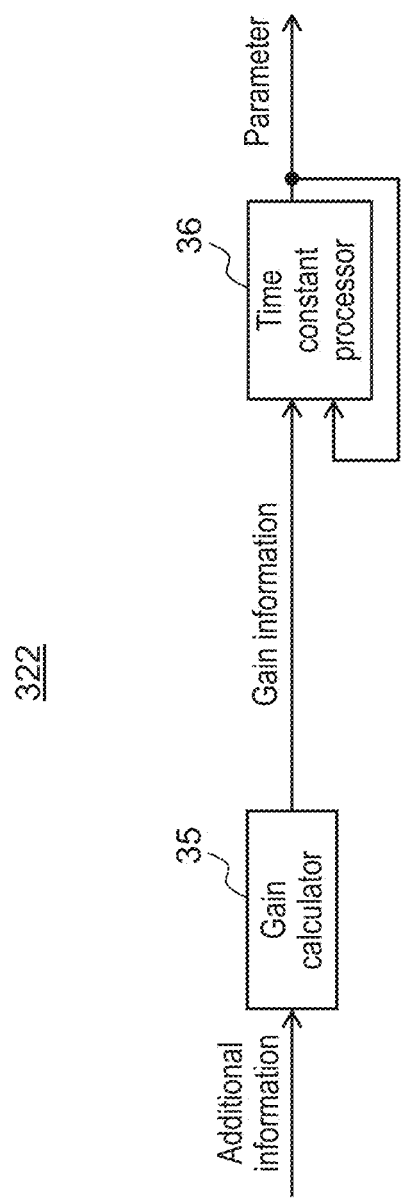
FIG. 6 is a block diagram schematically showing a configuration example of a parameter calculator in the first exemplary embodiment.

FIG. 6 is a block diagram schematically showing a configuration example of parameter calculator 322 in the first exemplary embodiment.

As shown in FIG. 6, parameter calculator 322 includes gain calculator 35 and time constant processor 36.

Gain calculator 35 is a circuit that calculates gain information based on the maximum brightness input as the additional information from receiver 31. Specifically, gain calculator 35 calculates the gain information from the maximum brightness by using a first threshold value, a second threshold value larger than the first threshold value, and a graph shown below.

Figure 7:
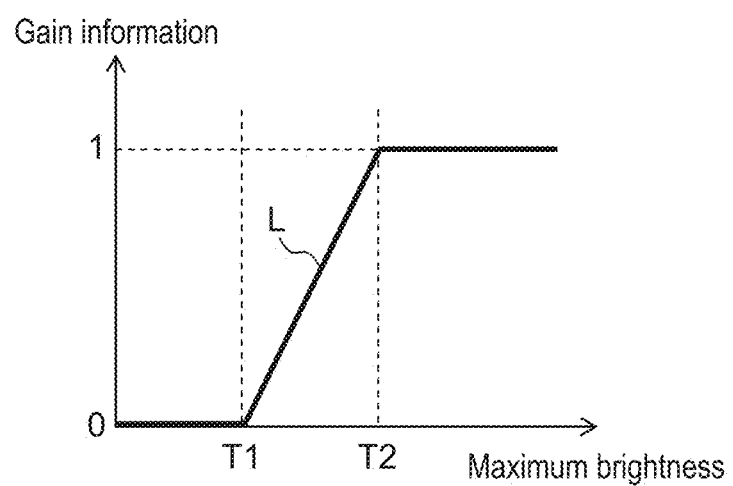
FIG. 7 is a graph showing an example of a relationship between gain information and a maximum brightness in the first exemplary embodiment.

FIG. 7 is a graph showing an example of a relationship between the gain information and the maximum brightness in the first exemplary embodiment.

As shown in FIG. 7, gain calculator 35 sets the gain information to "0" in a case where the maximum brightness is equal to or less than first threshold value T1, and sets the gain information to "1" in a case where the maximum brightness is equal to or more than second threshold value T2. Moreover, the graph shown in FIG. 7 is a linear graph, which connects "0" and "1" to each other, between first threshold value T1 and second threshold value T2. Therefore, gain calculator 35 defines a value, which is based on this linear portion L, as the gain information in a case where the maximum brightness stays between first threshold value T1 and second threshold value T2. This value is the predetermined ratio.

Note that first threshold value T1 and second threshold value T2 are set to appropriate values based on varieties of experiments, simulations and the like. Specifically, first threshold value T1 just needs to be a value approximate to the upper limit value of the dynamic range displayable by display 2. Moreover, second threshold value T2 just needs to be larger than first threshold value T1.

As shown in FIG. 6, time constant processor 36 is a circuit that calculates a parameter, which will be used next, based on current gain information calculated by gain calculator 35, and based on a parameter used immediately before, and outputs the calculated parameter to HDR/SDR converter 321. Specifically, time constant processor 36 calculates the parameter, for example, from Equation 2 shown below.

Parameter=calculated gain information×α+parameter used immediately before×(1+α) (Equation 2)

α is a weighting coefficient, and is a value that satisfies a following relationship: 0≤α≤1. α is set to an appropriate value based on varieties of experiments and/or simulations.

As shown in FIG. 1, selector 33 is a circuit that receives the input video signal, the output video signal obtained by converting the input video signal by converter 32, and the dynamic range information, selects either one of the input video signal and the output video signal based on the dynamic range information, and outputs the selected signal to display 2. Specifically, in a case of having received the HDR flag as the dynamic range information, that is, in a case where the input video signal is the video signal for the high-brightness display device, selector 33 selects the output video signal, and outputs the output video signal to display 2. Moreover, in a case of having received the SDR flag as the dynamic range information, that is, in a case where the input video signal is the video signal for the low-brightness display device, selector 33 selects the input video signal, and outputs the input video signal to display 2. Note that, in a case of having received neither the SDR flag nor the HDR flag, selector 33 may operate on the assumption of having received the SDR flag.

[1-2. Operations]

A description is made below of operations of tuner 3 configured as described above.

Figure 8:
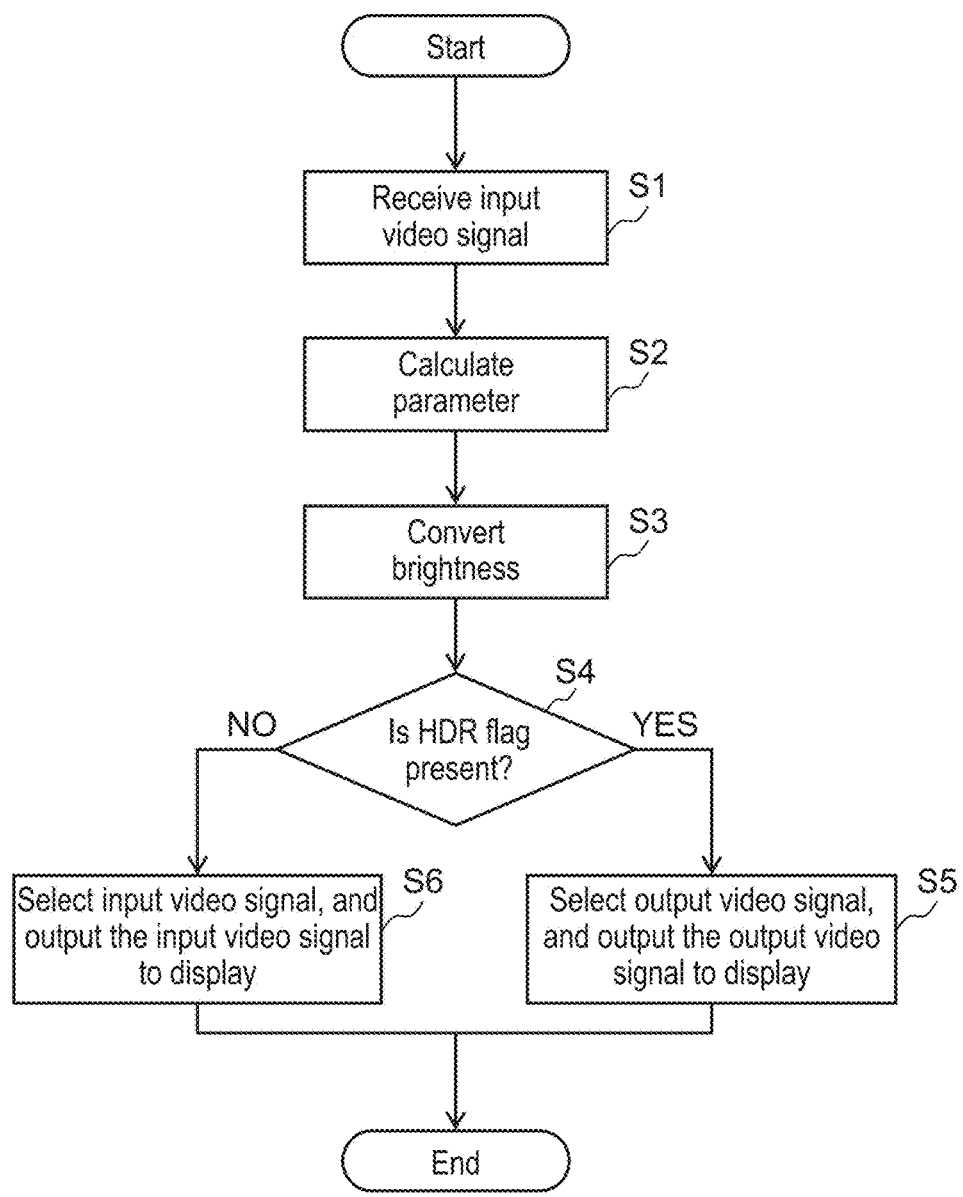
FIG. 8 is a flowchart showing an example of a signal processing method executed in a tuner in the first exemplary embodiment.

FIG. 8 is a flowchart showing an example of a signal processing method executed in tuner 3 in the first exemplary embodiment.

Upon receiving the broadcast wave from the antenna, receiver 31 converts the received broadcast wave into the input video signal. Then, receiver 31 outputs the additional information, which is added to the input video signal, to parameter calculator 322. Moreover, receiver 31 outputs the input video signal to HDR/SDR converter 321 and selector 33. Furthermore, receiver 31 outputs the dynamic range information, which is added to the input video signal, to selector 33 (Step S1).

Parameter calculator 322 calculates the parameter based on the additional information input from receiver 31, and outputs the calculated parameter to HDR/SDR converter 321 (Step S2).

HDR/SDR converter 321 performs brightness conversion, which is based on the parameter, for the input video signal input from receiver 31, thereby converts the input video signal into the output video signal, and outputs the output video signal to selector 33 (Step S3).

Selector 33 determines whether or not the HDR flag has been input from receiver 31 (Step S4). In a case of having determined that the HDR flag has been input in Step S4 (YES in Step S4), selector 33 selects the output video signal and outputs the selected output video signal to display 2 (Step S5).

In a case of having determined that the HDR flag has not been input in Step S4 (NO in Step S4), selector 33 selects the input video signal and outputs the selected input video signal to display 2 (Step S6).

Tuner 3 executes processing, which is based on this flowchart, for the input video signal of each frame. At the time when the parameter is calculated, such a parameter used immediately before (one frame before) is reflected on the parameter, which is calculated at present, by Equation 2 mentioned above. Therefore, even at timing when the gain information is switched from 1 to 0, tuner 3 can reduce a difference between the parameter used immediately before and the parameter calculated at present. That is to say, in tuner 3, at the time when the output video signal is generated, the parameter for use as the ratio of use can be prevented from being suddenly switched every frame. In such a way, display device 1 can suppress generation of flickering for each frame on the video to be displayed on display 2.

[1-3. Effects and the Like]

As described above, in this exemplary embodiment, the signal processing device is a signal processing device that outputs a video signal to a display. The signal processing device includes a converter and a selector. The converter converts an input video signal into an output video signal for a low-brightness display device in which an upper limit value of a range of a displayable brightness is smaller than an upper limit value in a high-brightness display device. The selector receives the input video signal and the output video signal, selects one of the input video signal and the output video signal, and outputs the selected video signal to the display. The selector selects the output video signal in a case where a high-brightness flag indicating a video signal for a high-brightness display device is added to the input video signal, and the selector selects the input video signal in a case where the high-brightness flag is not added to the input video signal.

Moreover, in this embodiment, the display device includes the signal processing device and the display.

Moreover, in this exemplary embodiment, the signal processing method is a signal processing method of outputting a video signal to a display. The signal processing method includes: converting an input video signal into an output video signal for a low-brightness display device in which an upper limit value of a range of a displayable brightness is smaller than an upper limit value in a high-brightness display device; and selecting one of the input video signal and the output video signal and outputting the selected video signal to the display, wherein the output video signal is selected in a case where a high-brightness flag indicating a video signal for the high-brightness display device is added to the input video signal, and the input video signal is selected in a case where the high-brightness flag is not added to the input video signal.

Note that display device 1 is an example of the display device. Display 2 is an example of the display, and is also an example of the low-brightness display device. Tuner 3 is an example of the signal processing device. Converter 32 is an example of the converter. Selector 33 is an example of the selector.

For example, in the example shown in the first exemplary embodiment, in the case where the high-brightness flag (HDR flag) is added to the input video signal in tuner 3, selector 33 selects the output video signal and outputs the output video signal to display 2. The output video signal is a signal obtained by converting the brightness of the input video signal so as to correspond to the range of the brightness displayable by display 2.

As described above, in tuner 3, the input video signal exceeding a display capability (dynamic range) of display 2 is converted into the output video signal matched with the display capability (dynamic range) of display 2. Selector 33 selects this output video signal, and outputs the selected output video signal to display 2. Hence, even in the case of having received such an input video signal that has the brightness exceeding the upper limit of the brightness displayable by display 2, display device 1 including tuner 3 can suppress the decrease of the image quality, and can display the video, which is based on the input video signal, on display 2.

Moreover, in the case where the HDR flag is not added to the input video signal, selector 33 selects the input video signal, and outputs the selected input video signal to display 2. The input video signal that is not added with the HDR flag is a video signal conforming to the standard dynamic range. Hence, even if display 2 is a display capable of displaying a video in the standard dynamic range, display device 1 can display the video, which is based on the input video signal, with sufficient image quality on display 2.

In the signal processing device, the converter may convert the input video signal into the output video signal by using at least one of at least two types of conversion characteristic curves.

Note that first conversion characteristic curve C1 and second conversion characteristic curve C2 are examples of the conversion characteristic curves.

For example, in the example shown in the first exemplary embodiment, in tuner 3, converter 32 converts the input video signal into the output video signal by using at least one of at least two types of the conversion characteristic curves (for example, first conversion characteristic curve C1 and second conversion characteristic curve C2). Hence, tuner 3 can convert the input video signal into the output video signal by using a conversion characteristic curve in which priority is given to the brightness, and by using a conversion characteristic curve in which priority is given to the gradation characteristics.

In the signal processing device, the converter may convert the input video signal into the output video signal by using at least two of the at least two types of conversion characteristic curves. Moreover, the converter may decide a ratio of use of the at least two types of conversion characteristic curves based on a value related to the brightness of the input video signal.

Note that the parameter calculated in parameter calculator 322 is an example of the ratio of use. Synthesizer 39 is an example of a processor that executes processing for synthesizing a first converted video signal, which is based on first conversion characteristic curve C1, and a second converted video signal, which is based on second conversion characteristic curve C2 with each other corresponding to the ratio of use.

For example, in the example shown in the first exemplary embodiment, in tuner 3, converter 32 decides the ratio of use between the at least two types of the conversion characteristic curves (for example, first conversion characteristic curve C1 and second conversion characteristic curve C2) based on the value related to the brightness of the input video signal. In such a way, tuner 3 can synthesize the first converted video signal, which is based on first conversion characteristic curve C1, and the second converted video signal, which is based on second conversion characteristic curve C2, by synthesizer 39 in the ratio of use, which is suitable for the brightness of the input video signal.

In the signal processing device, the first conversion characteristic curve between the at least two types of conversion characteristic curves may be a conversion characteristic curve of converting a signal in the input video signal, the signal reaching a brightness exceeding the upper limit value of the range of the brightness displayable by the display, into a signal with a brightness approximate to the upper limit value, and converting a brightness of a signal in the input video signal, the signal remaining in the range of the brightness displayable by the display, so that the brightness of the signal can be based on a predetermined standard. Moreover, between the at least two types of conversion characteristic curves, the second conversion characteristic curve may be a conversion characteristic curve of compressing the brightness of the input video signal so that the brightness can remain within the range of the brightness displayable by the display.

Note that first conversion characteristic curve C1 is an example of the first conversion characteristic curve. Second conversion characteristic curve C2 is an example of the second conversion characteristic curve.

For example, in the example shown in the first exemplary embodiment, the input video signal, in which the maximum brightness is equal to or less than first threshold value T1, is a video signal having a maximum brightness expressible in the dynamic range displayable by display 2. That is to say, this input video signal does not include a high-brightness portion undisplayable by display 2. If tuner 3 converts the brightness of this input video signal by using first conversion characteristic curve C1, tuner 3 can convert the input video signal into a video signal having lightness approximate to the original lightness, which is inherent in the input video signal, without generating the pseudo contour and the halation.

Meanwhile, the input video signal, in which the maximum brightness is larger than second threshold value T2, is a video signal having a maximum brightness undisplayable by display 2. If tuner 3 converts the brightness of this input video signal by using second conversion characteristic curve C2, tuner 3 can convert the input video signal into a video signal in which gradation characteristics are maintained though lightness is reduced more than the original lightness inherent in the input video signal.

The value related to the brightness of the input video signal may be included in additional information added in advance to the input video signal.

For example, in the example shown in the first exemplary embodiment, the value related to the brightness of the input video signal is included in the additional information added in advance to the input video signal, and accordingly, tuner 3 can directly acquire information, which is related to the brightness of the input video signal, from the additional information.

In the signal processing device, the value related to the brightness of the input video signal may be at least one of: a maximum brightness in one frame of the input video signal; an average brightness in one frame of the input video signal; an average maximum brightness per frame, which is calculated from maximum brightnesses in a predetermined number of frames of the input video signal; a brightness histogram in one frame of the input video signal; and a motion vector per unit pixel block included in the input video signal.

For example, in the example shown in the first exemplary embodiment, for the value related to the brightness of the input video signal, tuner 3 may use at least one of: a maximum brightness in one frame of the input video signal; an average brightness in one frame of the input video signal; an average maximum brightness per frame, which is calculated from maximum brightnesses in a predetermined number of frames of the input video signal; a brightness histogram in one frame of the input video signal; and a motion vector per unit pixel block included in the input video signal.

In the signal processing device, the converter may reflect a ratio of use, which has been used immediately before, on a ratio of use, which is calculated at present.

Note that time constant processor 36 is an example of a processor that executes processing for reflecting the ratio of use, which has been used immediately before, on the ratio of use, which is calculated at present.

For example, in the example shown in the first exemplary embodiment, in tuner 3, the parameter used immediately before is reflected on the parameter calculated at present, and accordingly, generation of a sudden change can be suppressed in a conversion result of the brightness for each frame. Hence, display device 1 including tuner 3 can suppress the generation of the flickering for each frame on the video to be displayed on display 2.

In the signal processing device, the converter may set the ratio of use of the first conversion characteristic curve to 100% in a case where the value related to the brightness of the input video signal is equal to or less than a first threshold value, may set the ratio of use of the second conversion characteristic curve to 100% in a case where the value related to the brightness of the input video signal is equal to or more than a second threshold value larger than the first threshold value, and may set the ratio of use between the first conversion characteristic curve and the second conversion characteristic curve to a predetermined ratio in a case where the value related to the brightness of the input video signal stays between the first threshold value and the second threshold value.

Note that the first converted video signal is an example of the video signal converted by using the first conversion characteristic curve. The second converted video signal is an example of the video signal converted by using the second conversion characteristic curve. First threshold value T1 is an example of the first threshold value. Second threshold value T2 is an example of the second threshold value. Linear portion L is an example of a function for deciding the predetermined ratio. The maximum brightness is an example of the value related to the brightness of the input video signal.

For example, in the example shown in the first exemplary embodiment, in the case where the maximum brightness is equal to or more than second threshold value T2, in converter 32, the gain information becomes "1", and the parameter also becomes "1". Therefore, in converter 32, the second converted video signal is used by 100% for the output video signal based on Equation 1. Moreover, in the case where the maximum brightness is equal to or less than first threshold value T1, in converter 32, the gain information becomes "0", and the parameter also becomes "0". Therefore, in converter 32, the first converted video signal is used by 100% for the output video signal based on Equation 1. Then, in the case where the maximum brightness stays between first threshold value T1 and second threshold value T2, in converter 32, the gain information takes a predetermined ratio that is based on the relationship of linear portion L, and the parameter also takes the predetermined ratio. Therefore, in converter 32, a signal, which is obtained by synthesizing the first converted video signal and the second converted video signal in the predetermined ratio, becomes the output video signal, based on Equation 1.

In such a way, in tuner 3, the parameter does not become only either one of "0" and "1", and a value between "0" and "1" is also used as the parameter. For example, in a case where the gain information is assigned to either one of "0" and "1" by one threshold value, if the maximum brightness exceeds the threshold value or falls down below the threshold value, then the gain information is switched suddenly. However, if two threshold values are used in order to decide the gain information, "0", "1" and the value between "0" and "1" are used as the gain information. In such a way, in tuner 3, when the maximum brightness varies in a vicinity of the threshold value, sudden switch of the gain information can be suppressed, and such a sudden change of the parameter can be suppressed.

In the signal processing device, the converter may set the ratio of use of the first conversion characteristic curve to 100% in the case where the value related to the brightness of the input video signal is equal to or less than the first threshold value, and may set the ratio of use of the second conversion characteristic curve to 100% in the case where the value related to the brightness of the input video signal is larger than the first threshold value.

For example, in the example shown in the first exemplary embodiment, converter 32 may set the ratio of use of the first converted video signal, which is based on first conversion characteristic curve C1, to 100% in the case where the maximum brightness is equal to or less than the first threshold value, and may set the ratio of use of the second converted video signal, which is based on second conversion characteristic curve C2, to 100% in the case where the maximum brightness is larger than the first threshold value.

Note that, in parameter calculator 322, the gain information may be directly used as the parameter without providing time constant processor 36.

Note that, in the first exemplary embodiment, the description has been made of such an operation example in which converter 32 of tuner 3 converts the input video signal into the output video signal by synthesizing the first converted video signal and the second converted video signal in the predetermined ratio. However, the present disclosure is not limited to this operation example. For example, converter 32 may synthesize first conversion characteristic curve C1 and second conversion characteristic curve C2 in the predetermined ratio, and may convert the input video signal into the output video signal by using a conversion characteristic curve after such synthesis. That is to say, in tuner 3, the conversion characteristic curves are not limited to the two types mentioned above, and three or more types thereof may be used.

Note that, in the first exemplary embodiment, the description has been made of such an operation example in which the input video signal is converted into the output video signal by converter 32 in each of the case where the HDR flag as the high-brightness flag is added to the input video signal and the case where the HDR flag is not added to the input video signal. However, the present disclosure is not limited to this operation example. For example, in the case where the HDR flag is not added to the input video signal, converter 32 does not have to convert the input video signal into the output video signal. That is to say, converter 32 may convert the input video signal to generate the output video signal at a time of having detected that the HDR flag is added to the input video signal.

Note that these general or specific aspects may be implemented by a system, a method, an integrated circuit, a computer program, and a recording medium, or may be implemented by arbitrary combinations of the system, the method, the integrated circuit, the computer program and the recording medium.

Second Exemplary Embodiment

A description is made below of a second exemplary embodiment with reference to FIG. 9 to FIG. 15.

Note that, in display device 1A shown in the second exemplary embodiment, the same reference numerals are assigned to constituents which perform substantially the same operations as those of the constituents provided in display device 1 shown in the first exemplary embodiment, and a description of these constituents of display device 1A are omitted. A description is mainly made below of different points from those of display device 1 shown in the first exemplary embodiment, and in some cases, a description of substantially the same operations as those of display device 1 shown in the first exemplary embodiment may be omitted.

[2-1. Configuration]

Figure 9:
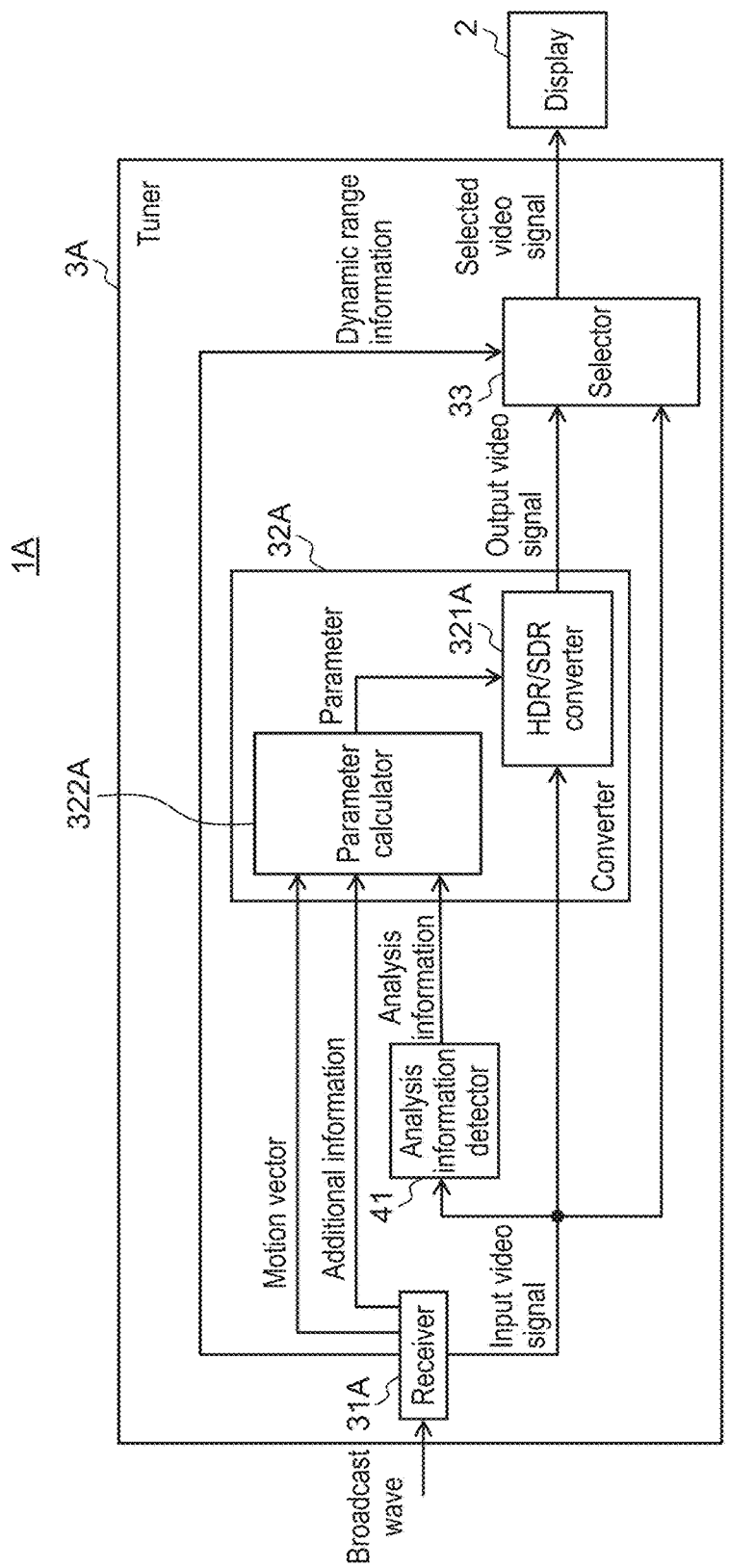
FIG. 9 is a block diagram schematically showing a configuration example of a display device in a second exemplary embodiment.

FIG. 9 is a block diagram schematically showing a configuration example of display device 1A in the second exemplary embodiment.

As shown in FIG. 9, display device 1A includes display 2 and tuner 3A. Display 2 and tuner 3A are communicably connected to each other. Display device 1A is, for example, a television.

Note that FIG. 9 only shows constituents, which are related to this exemplary embodiment, among a plurality of the constituents provided in display device 1A, and the other constituents are omitted. The other constituents include constituents provided generally in the television; however, a description of these is omitted.

[2-1.1. Tuner]

As shown in FIG. 9, tuner 3A in the second exemplary embodiment has substantially the same configuration as that of tuner 3 described in the first exemplary embodiment. In addition to this configuration, tuner 3A further includes analysis information detector 41. That is to say, tuner 3A provided in display device 1A of this exemplary embodiment includes receiver 31A, analysis information detector 41, converter 32A and selector 33.

Receiver 31A is a circuit that converts a broadcast wave, which is input through an antenna, into an input video signal.

Receiver 31A outputs additional information, which is added to an input video signal, to parameter calculator 322A of converter 32A. Moreover, receiver 31A outputs the input video signal to analysis information detector 41, HDR/SDR converter 321A and selector 33. Furthermore, receiver 31A outputs dynamic range information, which is added to the input video signal, to selector 33. Moreover, receiver 31A outputs a motion vector, which is calculated from the input video signal, to converter 32A.

Note that a generally used calculation method of the motion vector can be applied to the calculation of the motion vector, and accordingly, a detailed description of the calculation of the motion vector is omitted. Moreover, receiver 31A outputs, as a motion vector (scalar quantity), a sum total of absolute values of motion vectors (vector quantities) of one frame. Hence, with regard to the motion vector output from receiver 31A, a value thereof becomes relatively small in a video in which a motion is relatively slow (or a video in which a motion is relatively small), and a value thereof becomes relatively large in a video in which a motion is relatively fast (or a video in which a motion is relatively large). Note that, for example, receiver 31A may output, as the motion vector (scalar quantity), a maximum value of the absolute values of the motion vectors (vector quantities) of one frame. Alternatively, receiver 31A may output, as the motion vector (scalar quantity), a sum total of absolute values of motion vectors (vector quantities) in which the absolute values reach a predetermined value or more.

Figure 10:
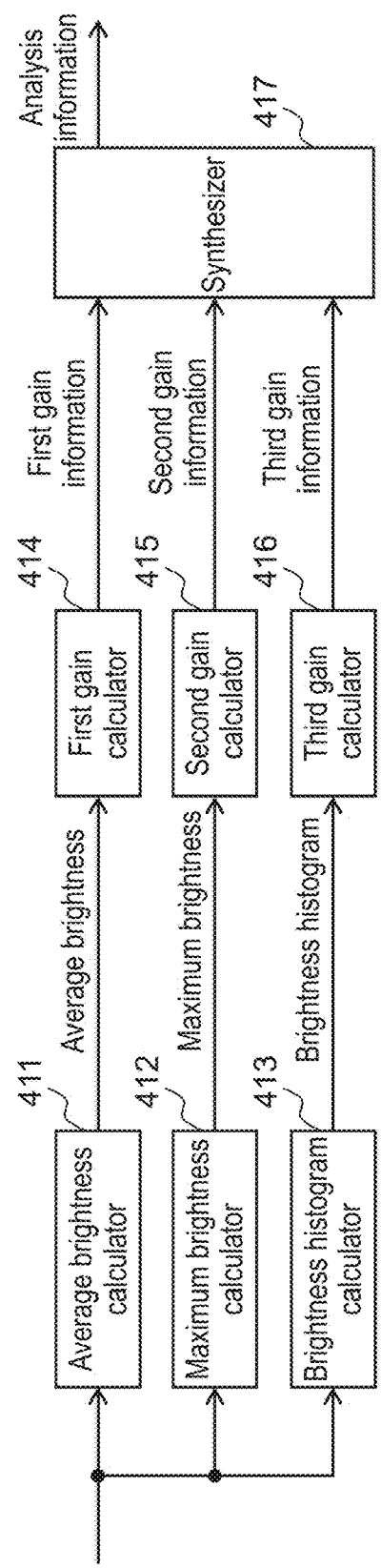
FIG. 10 is a block diagram schematically showing a configuration example of an analysis information detector in the second exemplary embodiment.

FIG. 10 is a block diagram schematically showing a configuration example of analysis information detector 41 in the second exemplary embodiment.

As shown in FIG. 10, analysis information detector 41 includes average brightness calculator 411, maximum brightness calculator 412, brightness histogram calculator 413, first gain calculator 414, second gain calculator 415, third gain calculator 416 and synthesizer 417.

Average brightness calculator 411 is a circuit that calculates an average brightness of the input video signal in one frame. Specifically, average brightness calculator 411 calculates an average value of brightnesses of (substantially) all pixels for one frame brought by the input video signal, and defines a result of the calculation as the average brightness.

Maximum brightness calculator 412 is a circuit that calculates a maximum brightness of the input video signal in one frame. Specifically, maximum brightness calculator 412 calculates a (substantially) maximum value from the brightnesses of (substantially) all pixels for one frame brought by the input video signal, and defines a result of the calculation as the maximum brightness.

Brightness histogram calculator 413 is a circuit that calculates a brightness histogram of the input video signal in one frame. Specifically, brightness histogram calculator 413 calculates a histogram of the brightnesses of all pixels for one frame brought by the input video signal.

Figure 11:
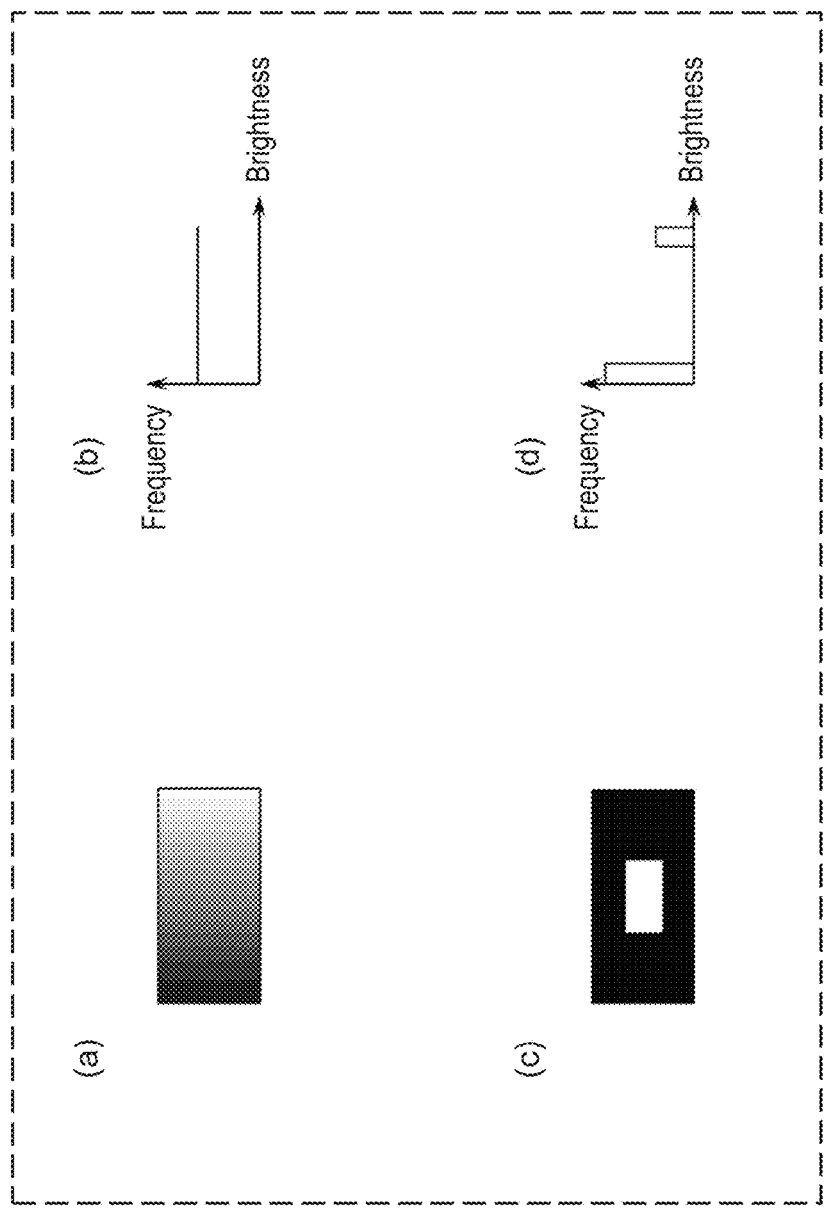
FIG. 11 is diagrams for explaining a brightness histogram in the second exemplary embodiment.

FIG. 11 is diagrams for explaining the brightness histogram in the second exemplary embodiment.

As shown in FIG. 11(a), in a case where an image brought by the input video signal is an image evenly subjected to gradation in one frame, a frequency of brightness becomes constant as a whole (refer to FIG. 11(b)). Moreover, as shown in FIG. 11(c), in a case where the image brought by the input video signal is an image, which includes a dark portion with a constant brightness and a light portion with a constant brightness in one frame, in which an area of the dark portion is larger, then the frequency of brightness becomes larger in the dark portion (refer to FIG. 11(d)). For the calculation of gain information based on the brightness histogram, a frequency of brightness of a high-brightness portion is required, and accordingly, brightness histogram calculator 413 defines, as the brightness histogram, a frequency of brightness at a high-brightness portion larger than a predetermined threshold value. Here, the predetermined threshold value just needs to be arbitrarily set between 0 and a maximum value of the brightness of the input video signal.

As shown in FIG. 10, first gain calculator 414 is a circuit that calculates first gain information based on the average brightness calculated by average brightness calculator 411. Specifically, gain calculator 35 calculates the first gain information from the maximum brightness by using a first threshold value, a second threshold value larger than the first threshold value, and a graph shown below.

Figure 12:
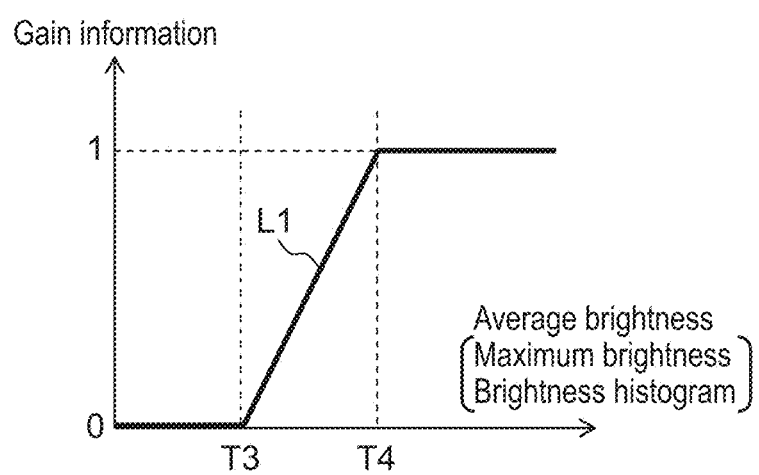
FIG. 12 is a graph showing an example of a relationship between gain information and a maximum brightness in the second exemplary embodiment.

FIG. 12 is a graph showing an example of a relationship between the gain information and the maximum brightness in the second exemplary embodiment.

As shown in FIG. 12, first gain calculator 414 sets the first gain information to "0" in a case where the maximum brightness is equal to or less than first threshold value T3, and sets the first gain information to "1" in a case where the maximum brightness is equal to or more than second threshold value T4. Moreover, the graph shown in FIG. 12 is a linear graph, which connects "0" and "1" to each other, between first threshold value T3 and second threshold value T4. Therefore, first gain calculator 414 defines a value, which is based on this linear portion L1, as the first gain information in a case where the maximum brightness stays between first threshold value T3 and second threshold value T4. This value is the predetermined ratio.

Second gain calculator 415 is a circuit that calculates second gain information based on the maximum brightness calculated by maximum brightness calculator 412.

Third gain calculator 416 is a circuit that calculates third gain information based on the brightness histogram calculated by brightness histogram calculator 413.

Note that second gain calculator 415 and third gain calculator 416 also calculate the respective pieces of gain information by using graphs similar to the graph shown in FIG. 12. However, first threshold value T3 and second threshold value T4 may be individually set to values different among first gain calculator 414, second gain calculator 415 and third gain calculator 416. First threshold value T3 and second threshold value T4 are set to appropriate values based on varieties of experiments, simulations and the like.

As shown in FIG. 10, synthesizer 417 is a circuit that calculates analysis information by synthesizing the first gain information, the second gain information and the third gain information with one another in the predetermined ratio, and outputs the analysis information to parameter calculator 322A. Specifically, synthesizer 417 calculates the analysis information by Equation 3 shown below:

$$\text{Analysis information} = \text{first gain information} \times \beta 1 + \text{second gain information} \times \beta 2 + \text{third gain information} \times (1 - \beta 1 - \beta 2) \quad \text{(Equation 3)}$$

$\beta 1$ and $\beta 2$ are weighting coefficients, and are values which satisfy a following relationship: $0 \leq \beta 1 \leq 1$, $0 \leq \beta 2 \leq 1$, $\beta 1 + \beta 2 \leq 1$. $\beta 1$ and $\beta 2$ are set to appropriate values based on varieties of experiments, simulations and the like.

Parameter calculator 322A is a circuit that calculates a parameter for converting the input video signal. Parameter calculator 322A calculates the parameter based on the additional information input from receiver 31A, on the analysis information input from analysis information detector 41, and on the motion vector input from receiver 31A.

Figure 13:
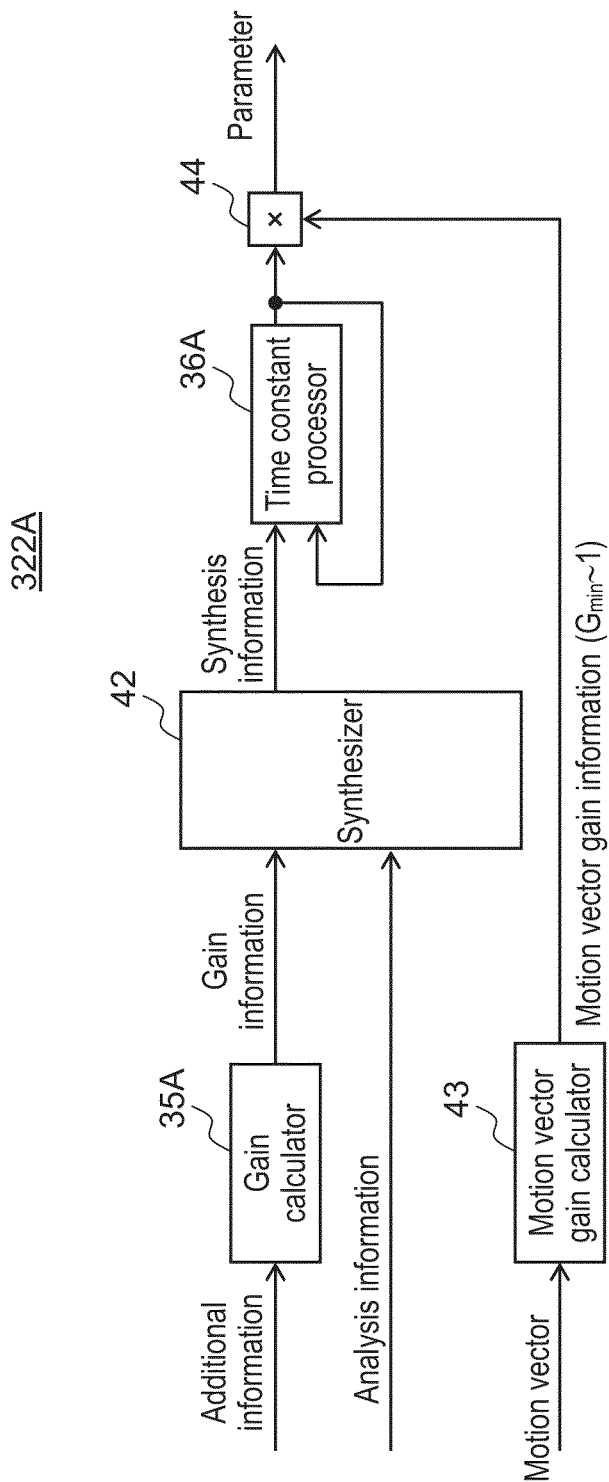
FIG. 13 is a block diagram schematically showing a configuration example of a parameter calculator in the second exemplary embodiment.

FIG. 13 is a block diagram schematically showing a configuration example of parameter calculator 322A in the second exemplary embodiment.

As shown in FIG. 13, parameter calculator 322A includes gain calculator 35A, synthesizer 42, time constant processor 36A, motion vector gain calculator 43 and integrator 44.

Gain calculator 35A is a circuit that calculates gain information based on the maximum brightness input as the additional information from receiver 31A. Specifically, gain calculator 35A calculates the gain information from the maximum brightness by using first threshold value T1, second threshold value T2 larger than the first threshold value, and the graph of FIG. 7. Gain calculator 35A is substantially the same as gain calculator 35 shown in the first exemplary embodiment, and accordingly, a detailed description thereof is omitted.

Synthesizer 42 is a circuit that generates synthesis information by synthesizing the gain information input from gain calculator 35A and the analysis information input from analysis information detector 41 with each other in the predetermined ratio, and outputs the synthesis information to time constant processor 36A. Specifically, synthesizer 42 generates the synthesis information by Equation 4 shown below:

$$\text{Synthesis information} = \text{calculated gain information} \times \delta + \text{analysis information} \times (1 - \delta) \quad \text{(Equation 4)}$$

$\delta$ is a weighting coefficient, and is a value that satisfies a following relationship: $0 \leq \delta \leq 1$. $\delta$ is set to an appropriate value based on varieties of experiments, simulations and the like.

Time constant processor 36A is a circuit that calculates a next parameter based on the current synthesis information calculated by synthesizer 42, and based on a parameter calculated immediately before by time constant processor 36A, and outputs the calculated parameter to integrator 44. Specifically, time constant processor 36A calculates the parameter, for example, from Equation 5 shown below:

Parameter=calculated synthesis information×γ+parameter calculated immediately before by time constant processor 36A×(1−γ)  (Equation 5)

γ is a weighting coefficient, and is a value that satisfies a following relationship: 0≤γ≤1. γ is set to an appropriate value based on varieties of experiments, simulations and the like.

Motion vector gain calculator 43 is a circuit that calculates motion vector gain information based on the motion vector input from receiver 31A, and outputs the calculated motion vector gain information to integrator 44. Specifically, motion vector gain calculator 43 calculates the motion vector gain information from the motion vector by using a first threshold value, a second threshold value larger than the first threshold value, and a graph shown below.

Figure 14:
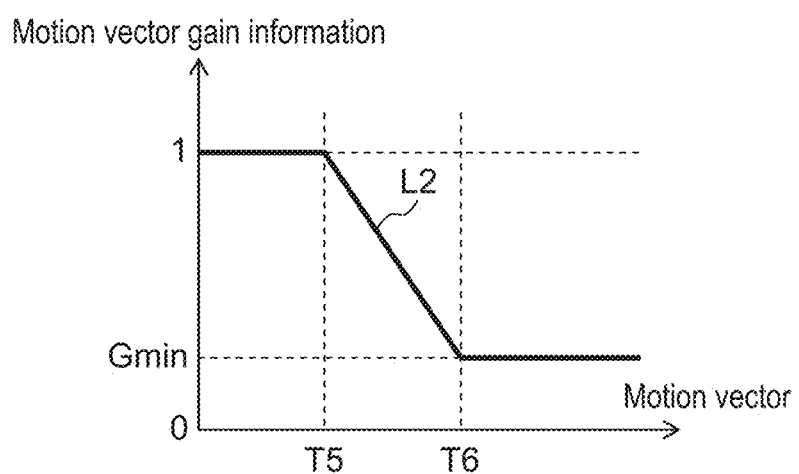
FIG. 14 is a graph showing an example of a relationship between motion vector gain information and a motion vector in the second exemplary embodiment.

FIG. 14 is a graph showing an example of a relationship between the motion vector gain information and the motion vector in the second exemplary embodiment.

As shown in FIG. 14, motion vector gain calculator 43 sets the motion vector gain information to "1" in a case where the motion vector is equal to or less than first threshold value T5, and sets the motion vector gain information to "Gmin" in a case where the motion vector is equal to or more than second threshold value T6. Gmin is a value that satisfies a following relationship: 0<Gmin<1.

Moreover, the graph shown in FIG. 14 is a linear graph, which connects "1" and "Gmin" to each other, between first threshold value T5 and second threshold value T6. Therefore, motion vector gain calculator 43 defines a value, which is based on this linear portion L2, as the motion vector gain information in a case where the motion vector stays between first threshold value T5 and second threshold value T6.

Hence, with regard to the motion vector gain information output from motion vector gain calculator 43, a value thereof becomes relatively large in a video in which a motion is relatively slow (or a video in which a motion is relatively small), and a value thereof becomes relatively small in a video in which a motion is relatively fast (or a video in which a motion is relatively large).

As shown in FIG. 13, integrator 44 is a circuit that integrates the motion vector gain, which is calculated by motion vector gain calculator 43, onto the parameter calculated by time constant processor 36A, and outputs a parameter, which is calculated by this integration, to HDR/SDR converter 321A.

Hence, with regard to the parameter output from integrator 44, a value thereof becomes relatively large in the video in which the motion is relatively slow (or the video in which the motion is relatively small), and a value thereof becomes relatively small in the video in which the motion is relatively fast (or the video in which the motion is relatively large).

As shown in FIG. 9, HDR/SDR converter 321A is a circuit that generates the output video signal in such a manner as follows. That is, HDR/SDR converter 321 implements brightness conversion processing for the input video signal by using a parameter calculated by parameter calculator 322A.

HDR/SDR converter 321A is substantially the same as HDR/SDR converter 321 shown in FIG. 2 in the first exemplary embodiment, and accordingly, a detailed description thereof is omitted. In a similar way to HDR/SDR converter 321, in HDR/SDR converter 321A, the ratio of the first converted video signal becomes relatively large when the value of the parameter is relatively small, and the ratio of the second converted video signal becomes relatively large when the value of the parameter is relatively large. Hence, with regard to the video signal output from HDR/SDR converter 321A, the ratio of the second converted video signal becomes relatively large in the video in which the motion is relatively slow (or the video in which the motion is relatively small), and the ratio of the first converted video signal becomes relatively large in the video in which the motion is relatively fast (or the video in which the motion is relatively large).

Selector 33 is a circuit that receives the input video signal and the output video signal obtained by converting the input video signal by converter 32A, selects either one of the input video signal and the output video signal, and outputs the selected signal to display 2. Specifically, in a case where the HDR flag is present, that is, in a case where the input video signal is the video signal for the high-brightness display device, selector 33 selects the output video signal, and outputs the output video signal to display 2. Moreover, in a case where the SDR flag is present, that is, in a case where the HDR flag is not present, selector 33 selects the input video signal, and outputs the input video signal to display 2.

[2-2. Operations]

A description is made below of operations of tuner 3A configured as described above.

FIG. 15 is a flowchart showing an example of a signal processing method executed in tuner 3A in the second exemplary embodiment.

Upon receiving the broadcast wave from the antenna, receiver 31A converts the received broadcast wave into the input video signal. Then, receiver 31A outputs the additional information, which is added to the input video signal, and the motion vector, which is calculated from the input video signal, to parameter calculator 322A. Moreover, receiver 31A outputs the input video signal to HDR/SDR converter 321A, selector 33 and analysis information detector 41. Moreover, receiver 31A outputs the dynamic range information, which is added to the input video signal, to selector 33 (Step S11).

Upon receiving the input video signal from receiver 31A, analysis information detector 41 calculates the average brightness, maximum brightness and brightness histogram of the input video signal per frame, and detects the analysis information based on these. Then, analysis information detector 41 outputs the analysis information to parameter calculator 322A (Step S12).

Parameter calculator 322A calculates the parameter based on the additional information input from receiver 31A, on the analysis information input from analysis information detector 41, and on the motion vector input from receiver 31A, and outputs the calculated parameter to HDR/SDR converter 321A (Step S13).

HDR/SDR converter 321A performs brightness conversion, which is based on the parameter, for the input video signal input from receiver 31A, thereby converts the input video signal into the output video signal, and outputs the output video signal to selector 33 (Step S14).

Selector 33 determines whether or not the HDR flag has been input from receiver 31A (Step S15).

In a case of having determined that the HDR flag has not been input in Step S15 (NO in Step S15), selector 33 selects the input video signal and outputs the selected input video signal to display 2 (Step S16).

In a case of having determined that the HDR flag has been input in Step S15 (YES in Step S15), selector 33 selects the output video signal and outputs the selected output video signal to display 2 (Step S17).

Tuner 3A executes processing, which is based on this flowchart, for the input video signal of each frame.

[2-3. Effects and the Like]

As described above, in this exemplary embodiment, the signal processing device further includes the analysis information detector that analyzes the input video signal and detects the analysis information. Then, the value related to the brightness of the input video signal is included in the analysis information detected by analyzing the input video signal in the analysis information detector.

Note that display device 1A is an example of the display device. Tuner 3A is an example of the signal processing device. Converter 32A is an example of the converter. The parameter calculated in parameter calculator 322A is an example of the ratio of use. Time constant processor 36A is an example of a processor that executes processing for reflecting the ratio of use, which has been used immediately before, on the ratio of use, which is calculated at present. Analysis information detector 41 is an example of the analysis information detector.

For example, in the example shown in the second exemplary embodiment, tuner 3A further includes analysis information detector 41 that analyzes the input video signal and detects the analysis information. Then, the value related to the brightness of the input video signal is included in the analysis information detected by analyzing the input video signal in the analysis information detector.

Hence, even if the value related to the brightness is not added to the input video signal, tuner 3A can calculate the value related to the brightness.

Particularly, in this exemplary embodiment, tuner 3A calculates the parameter by integrally using the analysis information and the additional information, and accordingly, is capable of calculating a parameter more suitable for the input video signal.

Other Exemplary Embodiments

As described above, the description has been made of the first and second exemplary embodiments as exemplary illustrations of the technology disclosed in the present application. However, the technology in the present disclosure is not limited to this, and is applicable also to exemplary embodiments, which are appropriately subjected to alteration, replacement, addition, omission, and the like. Moreover, it is also possible to constitute new exemplary embodiments by combining the respective constituent elements, which are described in the foregoing first and second exemplary embodiments, with one another.

Here, other exemplary embodiments are exemplified below.

In the first and second exemplary embodiments, exemplary descriptions have been made of the case where tuner 3 (3A) mounted on display device 1 (1A) is the signal processing device. However, the signal processing device may be a separate body from display device 1 (1A). As such a signal processing device separate from display device 1 (1A), for example, there can be applied a tuner device, an optical disc reproduction device, a game machine, a personal computer, a smart phone, a cellular phone, a tablet instrument, and the like. Note that, in this case, the signal processing device and the display device are made communicable with each other in advance by wire or radio, whereby the information indicating the dynamic range displayable by the display device can be output from the display device to the signal processing device.

Moreover, as a distribution method of the video signal, there are mentioned a distribution by recording media, a distribution by the Internet, and the like as well as such a distribution by the broadcast wave, which is as mentioned above. As the recording media, there are mentioned optical media such as a BLU-RAY (registered trademark) DISC, a flash memory such as an SD card, and the like.

Note that, in the above-described first and second exemplary embodiments, the respective constituents may be composed of dedicated hardware, or may be realized by executing software programs suitable for the respective constituents by a processor. The respective constituents may be realized in such a manner that a program execution unit such as a CPU (Central Processing Unit) or a processor reads out and executes a software program recorded in a recording medium such as a hard disk or a semiconductor memory.

Moreover, the present disclosure may be the above-described program, or may be a non-transitory computer-readable recording medium in which the above-described program is recorded.

As described above, the description has been made of the exemplary embodiments as the exemplary illustrations of the technology disclosed in the present disclosure. For this description, the accompanying drawings and the detailed description are provided.

Hence, the constituents described in the accompanying drawings and the detailed description can include not only constituents, which are essential for solving the problem, but also constituents, which are provided for exemplifying the above-described technology, and are not essential for solving the problem. Therefore, it should not be immediately recognized that such non-essential constituents are essential based on the fact that the non-essential constituents are described in the accompanying drawings and the detailed description.

Moreover, the above-mentioned exemplary embodiments are those for exemplifying the technology in the present disclosure, and accordingly, can be subjected to varieties of alterations, replacements, additions, omissions and the like within the scope of claims or within the scope of equivalents thereof.

INDUSTRIAL APPLICABILITY

The present disclosure is applicable to the signal processing device, the display device, the signal processing method, and the program, which process the video signal conforming to the standard that handles HDR. Specifically, the present disclosure is applicable to the video receiver such as a television, and the like.

REFERENCE MARKS IN THE DRAWINGS

1, 1A: display device
2: display
3, 3A: tuner
31, 31A: receiver
32, 32A: converter
33: selector
35, 35A: gain calculator
36, 36A: time constant processor
37: first gradation converter 38: second gradation converter
39, 42, 417: synthesizer
41: analysis information detector
43: motion vector gain calculator
321, 321A: HDR/SDR converter
322, 322A: parameter calculator
411: average brightness calculator
412: maximum brightness calculator
413: brightness histogram calculator
414: first gain calculator
415: second gain calculator
416: third gain calculator

The invention claimed is:

1. A signal processing device that outputs a video signal to a display, the signal processing device comprising:
a converter that converts an input video signal into an output video signal for a low-brightness display device in which an upper limit value of a range of a displayable brightness is smaller than an upper limit value in a high-brightness display device; and
a selector that receives the input video signal and the output video signal, selects one of the input video signal and the output video signal, and outputs the selected video signal to the display,
wherein the selector selects the output video signal in a case where a high-brightness flag indicating a video signal for the high-brightness display device is added to the input video signal, and selects the input video signal in a case where the high-brightness flag is not added to the input video signal.

2. The signal processing device according to claim 1,
wherein the converter converts the input video signal into the output video signal by using at least one of at least two types of conversion characteristic curves.

3. The signal processing device according to claim 2,
wherein the converter converts the input video signal into the output video signal by using at least two of the at least two types of conversion characteristic curves, and decides a ratio of use of the at least two types of conversion characteristic curves based on a value related to a brightness of the input video signal.

4. The signal processing device according to claim 3,
wherein, between the at least two types of conversion characteristic curves, a first conversion characteristic curve is a conversion characteristic curve of converting a signal in the input video signal, the signal reaching a brightness exceeding an upper limit value of a range of a brightness displayable by the display, into a signal with a brightness approximate to the upper limit value, and converting a brightness of a signal in the input video signal, the signal remaining in the range of the brightness displayable by the display, so that the brightness of the signal is based on a predetermined standard, and
wherein, between the at least two types of conversion characteristic curves, a second conversion characteristic curve is a conversion characteristic curve of compressing the brightness of the input video signal so that the brightness remains within the range of the brightness displayable by the display.

5. The signal processing device according to claim 4,
wherein the converter sets the ratio of use of the first conversion characteristic curve to 100% in a case where the value related to the brightness of the input video signal is equal to or less than a first threshold value, and sets the ratio of use of the second conversion characteristic curve to 100% in a case where the value related to the brightness of the input video signal is larger than the first threshold value.

6. The signal processing device according to claim 4,
wherein the converter:
sets the ratio of use of the first conversion characteristic curve to 100% in a case where the value related to the brightness of the input video signal is equal to or less than a first threshold value;
sets the ratio of use of the second conversion characteristic curve to 100% in a case where the value related to the brightness of the input video signal is equal to or more than a second threshold value larger than the first threshold value; and
sets the ratio of use between the first conversion characteristic curve and the second conversion characteristic curve to a predetermined ratio in a case where the value related to the brightness of the input video signal stays between the first threshold value and the second threshold value.

7. The signal processing device according to claim 3,
wherein the converter reflects the ratio of use, which has been used immediately before, on the ratio of use, which is calculated at present.

8. The signal processing device according to claim 3,
wherein the value related to the brightness of the input video signal is included in additional information added in advance to the input video signal.

9. The signal processing device according to claim 3, further comprising an analysis information detector that analyzes the input video signal and detects analysis information,
wherein the value related to the brightness of the input video signal is included in the analysis information detected by analyzing the input video signal in the analysis information detector.

10. The signal processing device according to claim 3,
wherein the value related to the brightness of the input video signal is at least one of: a maximum brightness in one frame of the input video signal; an average brightness in one frame of the input video signal; an average maximum brightness per frame, which is calculated from maximum brightnesses in a predetermined number of frames of the input video signal; a brightness histogram in one frame of the input video signal; and a motion vector per unit pixel block included in the input video signal.

11. A display device comprising:
the signal processing device according to claim 1; and
a display.

12. A signal processing method of outputting a video signal to a display, the signal processing method comprising:
converting an input video signal into an output video signal for a low-brightness display device in which an upper limit value of a range of a displayable brightness is smaller than an upper limit value in a high-brightness display device; and
selecting one of the input video signal and the output video signal and outputting the selected video signal to the display,
wherein the output video signal is selected in a case where a high-brightness flag indicating a video signal for the high-brightness display device is added to the input video signal, and the input video signal is selected in a case where the high-brightness flag is not added to the input video signal.

13. A non-transitory computer-readable recording medium storing a program for outputting a video signal to a display, the program causing a computer to execute:
  converting an input video signal into an output video signal for a low-brightness display device in which an upper limit value of a range of a displayable brightness is smaller than an upper limit value in a high-brightness display device; and
  selecting the output video signal and outputting the output video signal to the display in a case where a high-brightness flag indicating a video signal for the high-brightness display device is added to the input video signal, and selecting the input video signal and outputting the input video signal to the display in a case where the high-brightness flag is not added to the input video signal.

* * * * *